Patented Aug. 31, 1943

2,328,176

UNITED STATES PATENT OFFICE 2,328,176

PURIFICATION OF CARBON DISULPHIDE

Wilhelm Sonnenschein, Elsterberg i. V., Germany; vested in the Alien Property Custodian No Drawing. Application May 9, 1939, Serial No. 272,637. In Germany May 10, 1938

3 Claims. (Cl. 23—206)

This invention relates to methods for purifying carbon disulphide and more particularly the carbon disulphide which is recovered during viscose manufacturing operations.

Carbon disulphide, particularly after it has been used in viscose manufacturing operations, is contaminated with numerous impurities. Thus, it contains appreciable quantities of hydrogen sulphide and other bad smelling sulphur compounds such as the so-called thio-formaldehydes. These compounds are introduced into the carbon disulphide during the viscose manufacturing operations and are produced for example due to reduction of hydrogen sulphide. They are very difficult to remove since they cannot readily be destroyed or rendered odorless by means of ordinary oxidizing agents, except perhaps by the permanganates.

I have found by experiment that carbon disulphide so contaminated may be purified by relatively simple and economical means so as to render it entirely devoid of bad odors and adapted for most uses and especially for viscose manufacturing operations.

The method is preferably divided into two successively applied operations or stages. In the first stage, the crude, contaminated and bad smelling carbon disulphide is mixed as intimately as possible with a strong solution of an alkali, as for example a 30% solution of caustic soda having a specific gravity of 1.33, although other alkalis and other concentrations may be adapted for the purpose. The mixture is allowed to stand, whereupon it is separated by decantation from the caustic liquor which now contains most of the impurities. During this first stage of the process the hydrogen sulphide and perhaps also other impurities combine with or dissolve in the caustic liquir and are thus removed from the carbon disulphide. Nevertheless the carbon disulphide will still retain a strong odor reminiscent of some of these carbon disulphide reduction products. These are completely removed, however, in the second stage of the process.

In the second stage of the process the carbon disulphide is filtered through finely granular or pulverulent, pigment-like, adsorptive material which is adapted to remove any residual bad smelling impurities that may remain behind after the carbon disulphide has been subjected to the caustic liquor treatment. An example of such a material is alumina in the condition of sub-division recited above. Upon being filtered through such material, a colorless carbon disulphide is obtained, the odor of which is no longer masked by bad secondary odors. Such carbon disulphide may be used immediately in the arts and particularly in the manufacture of viscose.

Example 100 kg. of contaminated, bad smelling carbon disulphide, recovered by condensation or other means, for example from viscose manufacturing operations or other sources, are intimately stirred with 200 kg. of a 30% caustic soda solution in a closed vessel provided with stirring means until an emulsion-like mixture is produced. Thereupon the mixture is allowed to stand until complete separation of the carbon disulphide and the caustic liquor takes place. The heavy liquor may be either withdrawn from below or the carbon disulphide may be decanted off from above, or else any other suitable separatory method may be used. The thus preliminarily purified carbon disulphide is then passed through a filter containing pulverulent alumina. For example, 5 kg. of finely granular alumina may be used for the purpose, spread out on or enclosed between cloth or other suitable retaining means. The alumina filtering material may be used a number of times until thoroughly saturated with impurities, the length of effective life thereof depending on the quantity of impurities present in and removed from the carbon disulphide. After being saturated with impurities, the alumina may be regenerated and again rendered suitable for fresh operations, as by heating it to a suitable temperature to remove the impurities.

What I claim is:

1. In a process of purifying and de-odorizing carbon disulphide, the steps in sequence which comprises intimately mixing carbon disulphide, recovered during viscose manufacturing operations and contaminated by bad smelling, volatile, sulphur compounds comprising hydrogen sulphide and thioformaldehyde, with a caustic alkali solution containing about 30% by weight of a caustic alkali to dissolve a portion of said sulphur compounds from said carbon disulphide, substantially separating the partially purified carbon disulphide from said caustic alkali solution and then filtering the partially purified carbon disulphide through finely divided alumina to form colorless carbon disulphide completely free from said contaminating sulphur compounds.

2. In a process of purifying and de-odorizing carbon disulphide, the steps in sequence which comprises intimately mixing carbon disulphide, recovered during viscose manufacturing operations and contaminated by bad smelling, volatile, sulphur compounds comprising hydrogen sulphide and thioformaldehyde, with a caustic alkali solution containing about 30% by weight of caustic soda to dissolve a portion of said sulphur compounds from said carbon disulphide, substantially separating the partially purified carbon disulphide from said caustic alkali solution and then filtering the partially purified carbon disulphide through finely divided alumina to form colorless carbon disulphide completely free from said contaminating sulphur compounds.

3. In a process of purifying and de-odorizing carbon disulphide, the steps in sequence which comprises intimately mixing 100 kg. of carbon disulphide, recovered during viscose manufacturing operations and contaminated by bad smelling, volatile sulphur compounds comprising hydrogen sulphide and thioformaldehyde, with about 200 kg. of a caustic alkali solution containing about 30% by weight of caustic soda to dissolve a portion of said sulphur compounds from said carbon disulphide, substantially separating the partially purified carbon disulphide from said caustic alkali solution and then filtering the partially purified carbon disulphide through finely divided alumina to form colorless carbon disulphide completely free from said contaminating sulphur compounds.

WILHELM SONNENSCHEIN.